United States Patent
Tavanez et al.

(10) Patent No.: US 12,293,354 B2
(45) Date of Patent: May 6, 2025

(54) PEER-TO-PEER SELECTABLE DIGITAL MONEY SYSTEM

(71) Applicant: XiXVentures, LLC, San Antonio, TX (US)

(72) Inventors: Paul Roger Tavanez, San Antonio, TX (US); Richard Lee Grogan, Fountain Valley, CA (US)

(73) Assignee: XiXVentures, LLC, San Antonio, TX (US)

( * ) Notice: Subject to any disclaimer, the term of this patent is extended or adjusted under 35 U.S.C. 154(b) by 125 days.

(21) Appl. No.: 17/930,394

(22) Filed: Sep. 7, 2022

(65) Prior Publication Data

US 2023/0004955 A1    Jan. 5, 2023

Related U.S. Application Data

(63) Continuation-in-part of application No. 16/714,692, filed on Dec. 14, 2019.

(51) Int. Cl.
G06Q 20/36 (2012.01)
(52) U.S. Cl.
CPC ..... *G06Q 20/3674* (2013.01); *G06Q 20/3678* (2013.01); *G06Q 2220/00* (2013.01)
(58) Field of Classification Search
CPC ........... G06Q 20/3674; G06Q 20/3678; G06Q 2220/00; G06Q 20/065; G06Q 20/223; G06Q 20/3829
USPC .......................................................... 705/68
See application file for complete search history.

(56) References Cited

U.S. PATENT DOCUMENTS

| | | |
|---|---|---|
| 8,275,714 B2 | 9/2012 | Eugenio |
| 8,315,952 B2 | 11/2012 | Algiene |
| 8,738,539 B2 | 5/2014 | Al-herz et al. |
| 9,165,297 B2 | 10/2015 | Al-herz et al. |
| 9,171,324 B2 | 10/2015 | Al-herz et al. |
| 9,398,018 B2 | 7/2016 | Macgregor et al. |

(Continued)

FOREIGN PATENT DOCUMENTS

| | | |
|---|---|---|
| CN | 107230051 A | 10/2017 |
| CN | 107230051 | 6/2021 |

(Continued)

OTHER PUBLICATIONS

Islam et al., A Low-Cost Cross-Border Payment System Based on Auditable Cryptocurrency With Consortium Blockchain: Joint Digital Currency, 2022, IEEE Transactions on Services Computing, vol. 16, Issue 3, pp. 1616-1629. (Year: 2022).*

(Continued)

*Primary Examiner* — Scott C Anderson
*Assistant Examiner* — George N. Proios
(74) *Attorney, Agent, or Firm* — KPPB LLP

(57) ABSTRACT

A digital currency system that may make use of a distributed network in validating coin ownership as part of processing of transactions of coins of the currency. Compute devices may include both wallet modules and teller modules, with the wallet modules used for user access to digital currency related functions and the teller modules used for processing transactions of the many users. The system may provide automatic denomination coin unit change. The digital currency may be transformed into a physical representation. The digital currency may be virtual currency or cryptocurrency.

10 Claims, 8 Drawing Sheets

(56) References Cited

U.S. PATENT DOCUMENTS

| | | | |
|---|---|---|---|
| 9,406,054 B2 | 8/2016 | Al-herz et al. | |
| 9,710,808 B2 | 7/2017 | Slepinin | |
| 9,830,580 B2 | 11/2017 | Macgregor et al. | |
| 10,055,720 B2 | 8/2018 | Macgregor et al. | |
| 10,521,777 B2* | 12/2019 | Zhou et al. | G06Q 20/0658 |
| 10,776,761 B2* | 9/2020 | MacGregor et al. | G06Q 20/065 |
| 2016/0342988 A1* | 11/2016 | Thomas et al. | G06Q 20/401 |
| 2017/0132625 A1* | 5/2017 | Kennedy | G06Q 20/401 |
| 2017/0132626 A1* | 5/2017 | Kennedy | G06Q 20/401 |
| 2017/0148016 A1* | 5/2017 | Davis et al. | G06Q 20/3827 |
| 2018/0039960 A1* | 2/2018 | MacGregor et al. | G06Q 20/06 |
| 2018/0060860 A1* | 3/2018 | Tian et al. | G06Q 20/3829 |
| 2018/0374094 A1* | 12/2018 | Kohli | G06Q 20/401 |
| 2019/0130391 A1 | 5/2019 | Wright et al. | |
| 2019/0295069 A1* | 9/2019 | Pala et al. | G06Q 20/3678 |
| 2020/0242711 A1* | 7/2020 | Cao et al. | G06Q 50/18 |
| 2021/0065300 A1* | 3/2021 | Leshner et al. | G06Q 40/06 |
| 2021/0182804 A1 | 6/2021 | Tavanez et al. | |
| 2023/0004955 A1 | 1/2023 | Tavanez et al. | |

FOREIGN PATENT DOCUMENTS

| | | |
|---|---|---|
| CN | 107230051 B | 6/2021 |
| KR | 10-2019-0115553 | 10/2019 |
| KR | 20190115553 A | 10/2019 |
| KR | 10-2020-0139012 | 12/2020 |
| KR | 20200139012 A | 12/2020 |
| KR | 102308185 B1 | 10/2021 |
| KR | 10-2022-0056036 | 5/2022 |
| KR | 20220056036 A | 5/2022 |
| WO | 2024054899 A1 | 3/2024 |

OTHER PUBLICATIONS

Banupriya et al., An Analysis of Privacy Issues and Solutions in Public Blockchain (Bitcoin), 2021, 2nd International Conference for Emerging Technology (INCET), Belagavi, India, pp. 1-7. (Year: 2021).*

Khalilov et al., A Survey on Anonymity and Privacy in Bitcoin-Like Digital Cash Systems, 2018, IEEE Communication Surveys & Tutorials, vol. 20, No. 3, pp. 2543-2585. (Year: 2018).*

International Search Report on related PCT application (PCT/US2023/073624) from International Searching Authority (KIPO) dated Dec. 27, 2023.

Written Opinion on related PCT application (PCT/US2023/073624) from International Searching Authority (KIPO) dated Dec. 27, 2023.

International Search Report and Written Opinion for International Application No. PCT/US2023/073624, Search completed Dec. 27, 2023, Mailed Dec. 27, 2023, 7 Pgs.

International Written Opinion Application No. PCT/US2023/073624, Filing Date: Sep. 7, 2023, Report Completed Dec. 27, 2023, 4 pgs.

Roth, "The Future of Money: It's Flexible, Friction-less, and (Almost) Free", Wired Magazine, ASIN:B003HCOCVG, Mar. 2010.

Tapscott, "Blockchain Revolution", Brilliant Audio, Grand Haven, Michigan, ISBN:9781511357661, 2016.

* cited by examiner

FIG. 3C

Validation Files
- Value 1 — 371a
- Value 2 — 371b
- Value 3 — 371c
- ...
- Value M — 371m

FIG. 3B

Validation Files
- Coin ID1 — 351a
- Current Owner(s) — 353a
- Prior Owner(s) — 355a
- Validation Info — 357a
- Coin ID2 — 351b
- Current Owner(s) — 353b
- Prior Owner(s) — 355b
- Validation Info — 357b
- ...
- Coin IDn — 351n
- Current Owner(s) — 353n
- Prior Owner(s) — 355n
- Validation Info — 357n

PEER-TO-PEER SELECTABLE DIGITAL MONEY SYSTEM

CROSS REFERENCE TO RELATED APPLICATION

This application is a continuation-in-part (CIP) of U.S. patent application Ser. No. 16/714,692, filed on Dec. 14, 2019.

FIELD OF THE INVENTIONS

The present disclosure relates generally to digital currency, and more particularly to processing of ownership transfer of digital currency and transformation of digital currency into a physical representation.

BACKGROUND OF THE INVENTION

Digital currency may provide a convenience in storing and transferring currency between parties. A significant market also exists for what may be considered subsets of digital currencies, including cryptocurrencies and virtual currencies. Digital currencies, and especially cryptocurrencies may be bought and sold by numerous individuals and institutions every day, at times some of the digital currencies may even be used for the purchase of real goods or services.

Often transfer of those digital currencies necessitates performance of calculations by specialized third parties, for example those sometimes referred to as "miners", the calculations are generally complex, computationally expensive, and usually very energy intensive. Reliance on specialized third parties can be assessed as undesirable. For example, the specialized third parties for whatever reason may no longer find it a worthwhile endeavor to support the processing of transfers of any particular type of digital currency. Similarly, if the number of specialized third parties is small for a particular digital currency, the required computational processing may become temporarily unavailable due to unforeseen local or regional conditions, this may result in temporary market failures. Moreover, if the computations are complex to perform, the specialization required of the third parties may serve both to limit the number of specialized third parties and increase the cost of performing the calculations. All processing constraints generally increase the cost of calculations and may delay the final clearing and transaction resolution. The energy costs related to the performance of the calculations may also be prohibitive, possibly setting an effective ceiling as to the processing of the digital currencies that may be subject to the calculations. For example, while many use and propose further use of such calculations for digital currency generally, doing so may present environmentally damaging and resource wasting expenditures of energy and economic resources. For economies facing constrained electrical grids and power generation restraints, the use of computationally demanding cryptocurrency validation processes may present a significant infrastructure risk and unsustainable cost to society and individual participants. Moreover, at any time, any particular governmental authority may impose energy efficiency and environmental requirements. Such requirements may immediately and effectively limit or invalidate the user functional access to many digital currency, virtual currency, and cryptocurrency types.

In addition, digital currencies that may only be in digital form are subject to the vicissitudes and systemic risks of all things held in digital form. For example, computer memories storing information of particular items of digital currency may degrade, fail, be irretrievably damaged, or lost altogether. Any applicable passwords or digital keys required to access the computer memories or the digital currency may be forgotten, lost, absconded, or otherwise may become unusable. Third-party holding and processing of digital currency, virtual currency, and cryptocurrency often requires the assistance of specialized and expensive parties, for example authorized bank parties, cryptocurrency exchanges, and currency trading providers. As the implementation of illegal behavior by third-parties increases, the current ownership of a digital currency can be lost or transferred to that third-party or another party.

Cryptocurrency value generally cannot be transformed or held in physical form. The requirement of on-line use or holding may increase risk of loss. Having digital currency, virtual currency, or cryptocurrency digital holding only in digital form may increase the risk of loss due to computer failure, power surges, and other catastrophic events.

BRIEF SUMMARY OF THE INVENTION

Some embodiments in accordance with aspects of the invention provide a peer-to-peer digital currency utilizing a peer based third-party validation method increases speed, scalability, and ease-of-use all while lowering costs. Some embodiments provide a digital currency that is more energy efficient, lower cost, more secure, and that can be physically owned, possessed, and held. In some embodiments the digital currency can be converted into a physical form and then back into digital form as desired.

Some aspects provide a method of validating ownership, by a compute device, of a coin of a digital currency for purposes of completing a transaction, comprising: receiving a request to validate ownership of the coin from a user compute device and validation information for the coin, the validation information having been stored in a coin data file of the user compute device; providing the validation information to a plurality of other user compute devices, at least one of the other user compute devices storing information to be used in validating ownership of the coin by the owner; receiving from at least one of the other use compute devices a message that ownership of the coin by the owner is validated; and in response to receiving the message that ownership of the coin is validated, sending a message to the user compute device that ownership of the coin is validated and distributing information for use in validating that the to-be owner of the coin is now the owner of the coin to at least some of the other user compute devices.

In some aspects the information for use in validating that the to-be owner of the coin is now the owner of the coin comprises information based on information of a coin data file reflecting that the to-be owner of the coin is now the owner of the coin. In some aspects the validation information comprises information based on validation information stored in the coin data file. In some aspects the owner of the coin comprises a plurality of owners of the coin. In some aspects the to-be owner of the coin comprises a plurality of to-be owners of the coin. In some aspects at least one of the compute device, user compute device, and the other compute devices are configured to provide wallet functions and teller functions. In some such aspects the wallet functions include storing of information of coins owned by a user of the user compute device and the teller functions include functions for validating ownership of coins. In some such aspects the teller functions of the compute device command the providing the validation information to the plurality of other user compute devices and command the distributing information indicating that the to-be owner of the coin is now the owner of the coin to at least some of the other user compute devices. Some aspects further comprise sending the coin data file from the user compute device to a user compute device of the to-be owner of the coin. In some aspects the compute device stores network contact information for the plurality of other user compute devices, and the compute device utilizes the network contact information for the plurality of other user compute devices in providing the identification of the coin, the information of the owner of the coin, and the validation information to the plurality of other user compute devices.

Some aspects provide a system for supporting digital currency transactions, comprising: a plurality of user compute devices, each user compute device comprising at least one processor, memory, and network communications capabilities, the memory storing a wallet module and/or a teller module, the wallet module and/or the teller including program instructions to configure operation of the at least one processor; the program instructions of the wallet module including program instructions to: store information of coins owned by a user of the user compute device in memory of the user compute device, information of each coin stored in a separate file; request validation of ownership of coins by the user of the user compute device from at least one other user compute device; and command sending of the files for coins to a further user compute device; the program instructions of the teller module including program instructions to: store ownership information of coins owned by users of other user compute devices in memory of the user compute device; and process requests for validation of ownership of coins by users of other user compute devices.

In some aspects the program instructions to request validation of ownership of coins by the user of the user compute device from at least one other user compute device comprise program instructions to request validation of ownership of coins by the user of the user compute device from at least one other user compute device on a coin-by-coin basis. In some aspects the program instructions to process requests for validation of ownership of coins by users of other user compute devices include program instructions to request validation of ownership of a coin from a plurality of other user compute devices. In some aspects the ownership information of coins owned by users of other user compute devices includes validation information. In some such aspects the program instructions to process requests for validation of ownership of coins by users of other user compute devices include program instructions to perform an operation on or with validation information provided with the requests for validation of ownership of coins by users of other user compute devices. In some such aspects each file storing the information of coins owned by a user of the user compute device includes an identification of the coin, an identification of at least one owner of the coin, and validation information for the coin. In some such aspects each file storing the information of coins owned by a user of the user compute device further includes a denomination of the coin. In some such aspects the identification of at least one owner of the coin consists of identification of a single owner of the coin. In some such aspects the identification of at least one owner of the coin comprises identification of one or a plurality of owners of the coin.

These and other aspects of the invention are more fully comprehended upon review of this disclosure.

BRIEF DESCRIPTION OF THE FIGURES

FIG. 3B is a table of example contents of a validation file, in accordance with aspects of the invention.

FIG. 3C is a table of further example contents of a validation file, in accordance with aspects of the invention.

DETAILED DESCRIPTION

Figure 1:
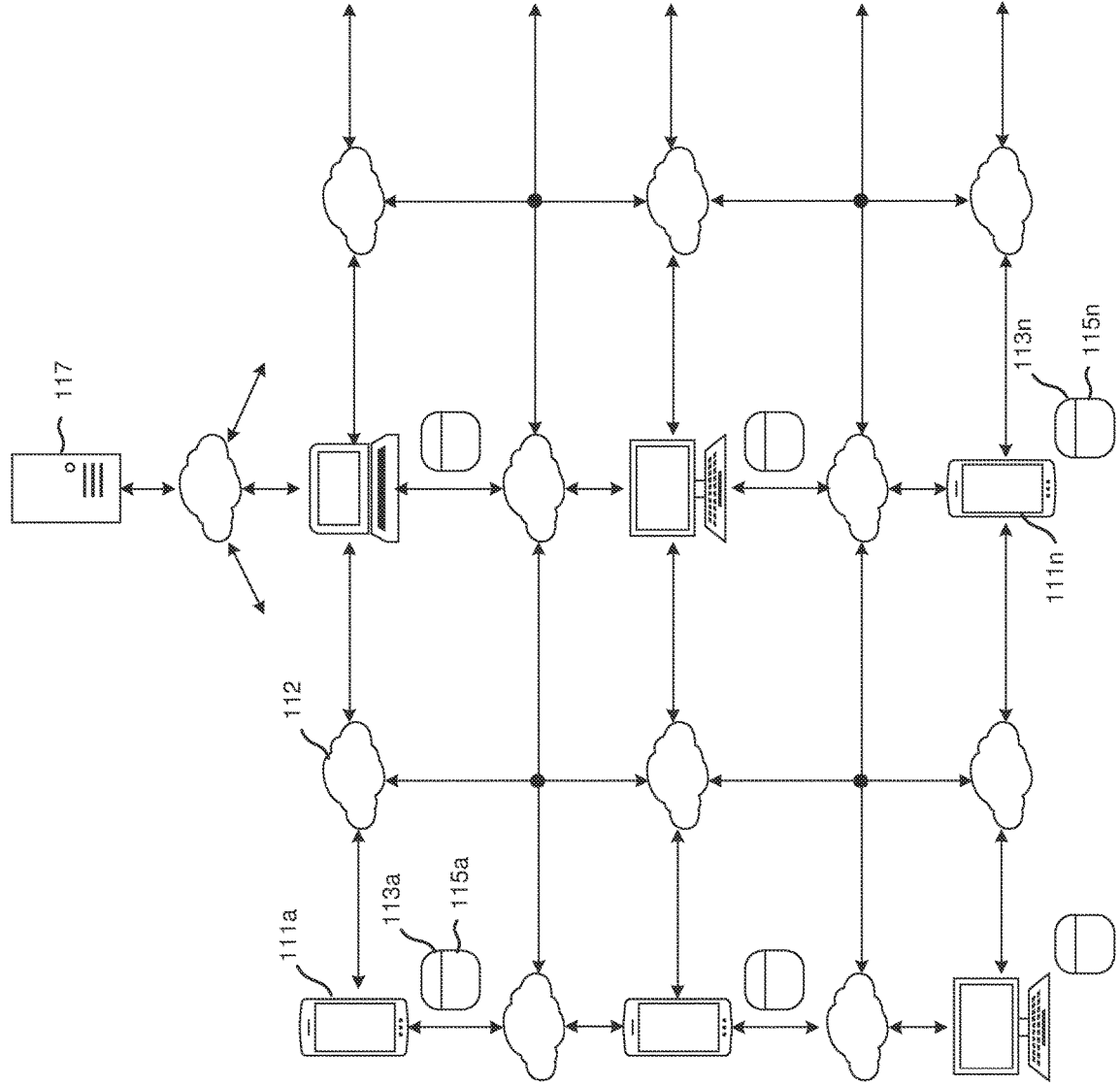
FIG. 1 is a semi-block diagram of a distributed digital currency ownership record maintenance and transfer system, in accordance with aspects of the invention.

FIG. 1 is a semi-block diagram of a distributed digital currency ownership record maintenance and transfer system. The system may also be used for digital currency generally, and may be considered a distributed digital currency ownership record maintenance and transfer system. The system includes a plurality of user compute devices 111a-n, as shown in FIG. 1. The user compute devices may include, variously, smartphones, personal computers (whether in desktop or laptop configurations), tablets, or other devices including at least one processor, memory and network communication capabilities. In some embodiments the user compute devices may include computer servers. In some embodiments the memory comprises a volatile storage subsystem and/or a direct access storage subsystem. The user compute devices are communicatively coupled, with the devices shown as coupled together by network elements 112 in FIG. 1. In some embodiments the user compute devices are communicatively coupled together in what may be considered a mesh network configuration, although in many embodiments the mesh network utilizes a wide area network, for example the Internet, a cellular communication network, and/or other networks, or a combination of some or all of those networks.

At least some of the user compute devices are configured to perform what may be considered digital currency "wallet" functions, and at least some of the user compute devices are configured to perform what may be considered digital currency "teller" functions. In some embodiments some user compute devices may be configured to perform wallet functions, and not configured to perform teller functions. Conversely, in some embodiments some user compute devices may be configured to perform teller functions, and not configured to perform wallet functions. In various embodiments, however, at least some user compute devices may be configured to perform both wallet and teller functions. In FIG. 1, for example, each of the user compute devices is configured to perform what may be considered a digital currency "wallet" 113a through 113n functions and digital currency "teller" 115a through 115n functions. The wallet functions may be provided by way of "wallet" program instructions executable by one or more processors of the compute devices. The "wallet" program instructions generally include program instructions for storing information in memory, regarding digital currency owned by the user, for performing operations for display of information regarding the digital currency owned by the user on a display device of or associated with the user compute device, and for requesting or receiving transactions of digital currency. The teller functions may be provided by way of "teller" program instructions executable by the one or more processor of the user compute devices. The "teller" program instructions generally include program instructions for validating ownership of digital currency in response to requests for transfer of ownership of the digital currency.

The user compute devices are also shown communicatively as coupled to a server 117 in FIG. 1. The user compute devices may be intermittently communicatively coupled to the server in some embodiments, and in some embodiments the user compute devices, or some of them, may never communicate with the server. The server may be configured to generate digital currency, distribute the digital currency to various of the user compute devices for processing by the wallet program instructions, and distribute initial ownership records to various of the user compute devices for processing by the teller program instructions. In some embodiments the server is a user compute device. In some embodiments the server or user compute device so configured may be considered a digital currency creating computing device. In some embodiments the server or user compute device so configured may be considered a coin minting computing device. In some embodiments the server may perform wallet and/or teller functions. In some embodiments the server is configured to provide for initial generation of the digital currency, and thereafter provide no further functions.

Digital currency may be transferred from a first user associated with a first user compute device to a second user associated with a second user compute device. In operation, the first user compute device, through operation of its wallet program instructions, sends a request to a third compute device to validate ownership of the digital currency by the first user. In some embodiments the third compute device is a user compute device. In some embodiments the third compute device is a server. The third compute device, through operation of its teller program instructions, in turn sends requests to any number of other compute devices to validate ownership of the digital currency by the first user. In some embodiments the third compute device sends a request to a single other compute device. In some embodiments the third compute device sends requests to a plurality of other compute devices. In some embodiments the other compute device are user compute devices. In some embodiments the other compute devices comprise at least one server. In some embodiments the other compute devices comprise a plurality of servers. In some embodiments the plurality of other compute devices are virtual machines executing on one or more processors that could be considered part of the server. The plurality of other compute devices, through operation of their teller program instructions, determine if records of digital currency ownership maintained by those other compute devices indicate ownership of the digital currency by the first user. If so, the other compute devices, again through operation of their teller program instructions, provide the third compute device a confirmation that the first user owns the digital currency. If any of the other compute devices provide the confirmation of ownership of the digital currency by the first user, the third compute device, through operation of its teller program instructions, sends the first user compute device information confirming ownership of the digital currency by the first user, and allowing for transfer of ownership of the digital currency to the second user. The first user compute device, through operation of its wallet program instructions, sends the second user compute device information to transfer ownership of the digital currency to the second user. In addition, the third compute device, through operation of its teller program instructions, sends updated ownership information to the other compute devices and user compute devices, so that the other compute devices may update records of digital currency ownership maintained by those other compute devices. In some embodiments the second, third, and so on compute devices are other user compute devices.

In some embodiments the digital currency may comprise, and in some embodiments consist of discrete units, which for convenience may be termed "coins." In some embodiments the coins may be of different predetermined denominations representing aggregated value bundles. Information of a coin may be contained in a set of discrete records, which may be in the form of a data structure container, a file, or a set of files, which for convenience may be termed a coin data file. The coin data files may include information regarding details of the digital currency represented by the coin and the ownership of the coin. In some embodiments the coin data files may be stored in memory associated with wallet program instructions of a user compute device of an owner of the coin. In some embodiments, transfer of ownership of a coin includes transfer of the coin data files for the coin from a user compute device of a then-current owner of that coin to a user compute device of a new owner of that coin.

In some embodiments, user compute devices, other than the user compute device of an owner of a coin, store records of ownership of the coin. The records may be stored in a file or files, which may be termed validation files. In some embodiments the validation files may be stored in memory of compute devices, in some embodiments in a direct access storage subsystem in compute devices. In some embodiments the validation files may be stored in memory of a server, or a plurality of servers. In some embodiments the validation files may be stored in memory associated with, or accessible by, different virtual machines executing on a server. In some embodiments the validation files include ownership records for a plurality of coins. In some embodiments the validation files include records which may be used to validate ownership of a plurality of coins. In some embodiments the user compute devices, or compute devices in some embodiments, use records of the validation files to validate ownership of coins.

Figure 2:
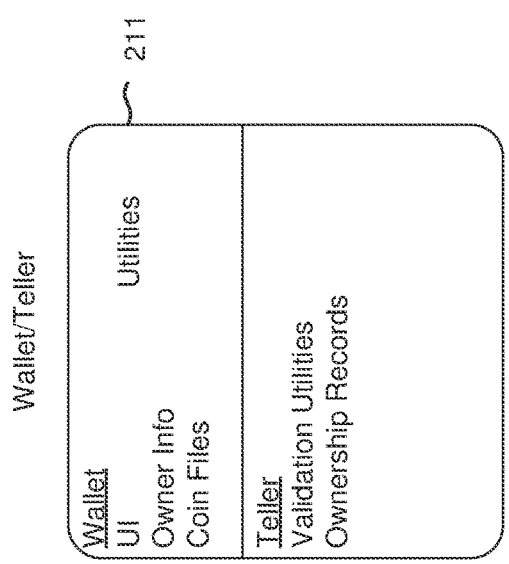
FIG. 2 shows an example wallet-teller component, in accordance with aspects of the invention.

FIG. 2 shows an example wallet-teller component. In some embodiments the wallet-teller is a software component on a compute device. In some embodiments the compute device is a user compute device, for example a user compute devices of FIG. 1. In some embodiments the compute device is a server. In some embodiments the teller portion of the wallet-teller component may be inactive for wallet-teller components resident on a server. In some embodiments the wallet-teller component comprises program instructions and data structures stored in memory of a compute device. In some embodiments the program instructions and data structures are stored in a direct access storage subsystem of the compute device. In some embodiments the wallet-teller component is implemented as a separate wallet component and a separate teller component.

In some embodiments the wallet portion 211 of the wallet-teller component includes user interface functions and utility functions. The wallet portion of the wallet-teller component may be considered a digital wallet. In some embodiments the user interface functions provide for a user interface (UI) on the user compute device. The user interface may be, for example, a graphical user interface. In some embodiments the user interface may make use of hardware input and/or output elements associated with the user compute device. In some embodiments the user interface allows a user to access and execute utility functions of the wallet. In some embodiments the utility functions include functions to display information regarding coin data held in the wallet, functions to receive coins from wallets of other user compute devices, and functions to send coins to wallets of other user compute devices.

The data regarding coins owned by the user may include a plurality of coin ownership data records. The records may be arranged, for example, in one or more files. In some embodiments each coin has an associated file. In some embodiments the records for each coin include a unique identifier for the coin, indicate a denomination for the coin, and indicate the owner of the coin. In some embodiments the records for each coin include records containing additional information. In some embodiments the records containing additional information include records indicating prior ownership of the coin. In some embodiments the records containing additional information include records indicating time of ownership and/or prior ownership of the coin. In some embodiments the records containing additional information provides an on-going record of time-based chain-of-custody of ownership of the coin.

In some embodiments the teller portion of the wallet-teller component includes validation utilities and coin ownership records. The teller portion of the wallet-teller component performs what may be considered teller functions, and may be considered a teller. The validation utilities include functions to receive requests to transfer ownership of coins, and to validate that a party making an ownership claim of a coin is the recorded owner of the coin. In some embodiments the validation utilities include functions to request other tellers (of other compute devices) to validate that a party requesting transfer of a coin is the owner of the coin.

Figure 3A:
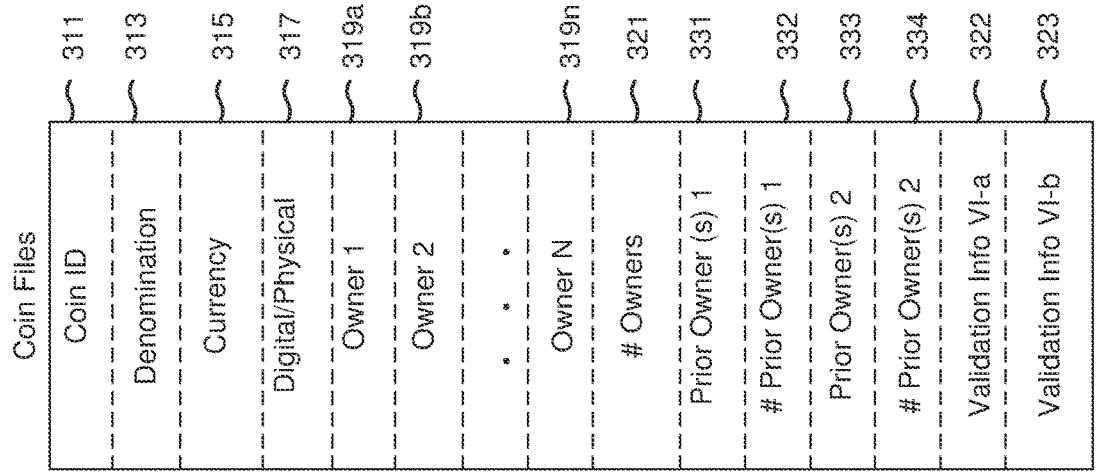
FIG. 3A is a table of example contents of a coin data file, in accordance with aspects of the invention.

FIG. 3A is a table of example contents of a coin data files. The coin data file may be used as the coin data file discussed with respect to FIG. 1 and FIG. 2. In some embodiments the coin data file is stored in memory of a user compute device, for example in a direct access storage subsystem of the user compute device. In some embodiments the memory is associated with a wallet, for example the wallet of FIG. 1 or FIG. 2. In some embodiments the coin data file includes information concerning a particular coin of a digital currency.

The example coin data file of FIG. 3A includes the following fields: coin identification 311; denomination 313; currency 315; digital/physical 317; various fields relating to ownership of the coin, including number of current owners 318, owner 1 319a, owner 2 319b, to owner N 319n, with N equal to the number of current owners, first validation information (VI-a) 322, and second validation information (VI-b) 323.

In some embodiments data of the coin identification field uniquely identifies the coin. In such embodiments, the data of the coin identification field may be considered a unique identifier. In some embodiments, however, the data of the coin identification field uniquely identifies the coin only when considered with other information of the coin file. In some embodiments the other information may include one, some, or all of the denomination field and the currency field.

Data of the denomination field indicates a denomination of the coin. In some embodiments the denomination field may be any integer number. In some embodiments the denomination field may be a negative number. In some embodiments the Denomination 313 field may be any real number. In some embodiments the Denomination 313 field may only be predetermined positive integer numbers, for example 1, 5, 10, 20, 50, 100, 500, 1000, 5000, 10000, 100000, and so on.

In some embodiments data of the currency 315 field indicates a currency name for the coin. In some embodiments the currency name indicates a particular digital currency. In some embodiments the currency name indicates a particular fiat currency. In some embodiments the Currency 315 field name is used to reference and equate the digital currency with a fiat currency economic value and economic representation. In some embodiments the Currency 315 field name is used to reference stored economic value for a third-party entity, for example, corporations, companies, organizations, and similarly recognized groups.

The digital/physical 317 field may include information indicating whether the coin has been transformed into a physical object. For example, in some embodiments the coin may be in digital form, for example in the form of a coin data file.

In some embodiments the coin may optionally be transformed into the form of a physical object or, in some embodiments, as a series of physical objects. The physical object includes information of the coin data file, in some embodiments all of the information of the coin data file. In some embodiments the information of the coin data files is directly readable from the physical object by a human. In some embodiments information of the physical object is encoded on or as part of the physical object, with the information visible to a human but generally readable using a reader device, for example a QR code or similar code. For example, the physical object may be in the form of two-dimensional (2D) information held on a three-dimensional (3D) form, for example paper printed with alpha-numeric information of the coin data File. Also for example, the physical object may be in or on a piece of physical material, for example a three-dimensional (3D) sculpture, with the information of the coin data file imprinted onto or within the physical material. In some embodiments this may be considered as uniting the physical object and the coin whose information is imprinted onto or within the physical object. In some embodiments the physical form may be dynamically selected or may be user selected. In some embodiments the physical object may be generated by a three-dimensional (3D) printing devices. In some embodiments the physical object may be in the form of a molten cast object, a stamped object, laser-cut object, or other similar three-dimensional (3D) object production forms.

The Owner 1 data field 319a includes data identifying the current owner. In some embodiments there may be a plurality of current owners, who may, for example, concurrently jointly own the coin. The coin data file may therefore include an additional Owner 2 319b field, and so on as appropriate, up to an owner N 319n field, with N representing a number of concurrent owners of the coin. In some embodiments, and as shown in FIG. 3A, to quantify the correct number of a plurality of possible concurrent owners, coin data file includes a number of owners field 321. In some embodiments data in the owner data fields identifies owners by name. In some embodiments data in the owner data fields identifies owners by a unique identifier associated with each owner. In some embodiments data in the number of owners field specifies a number of owners used in determining and identifying current owners.

In some embodiments additional fields may be included. In some embodiments the coin data file may include prior owner(s) fields The prior owner(s) fields may contain data identifying prior owners of the coin. The example table of FIG. 3A shows fields for two sets of prior owners. The two sets of prior owners may be, for example, the two sets of prior owners who held the coin immediately prior to the current owner of the coin. FIG. 3A shows a prior owner(s) 1 field 331 and a number of prior owner(s) 1 field 332. Similarly, FIG. 3A shows a prior owner(s) 2 field 333 and a number of prior owner(s) 2 field 334. In some embodiment the prior owner(s) 1 field and the prior owners(s) 2 field may be each be replaced by a plurality of fields, with a separate field listing each of the prior owners of the set, for example as set forth for the owner fields 319$a$-$n$. In various embodiments the coin file(s) may include information of no prior owners, one set of prior owners, any number of prior owners, or all prior owners.

The coin data file may also include a first validation information (VI-a) field 322, and, in some embodiments, a second validation information (VI-b) field 323. In some embodiments the coin data File includes further validation information fields. In some embodiments the validation information (VI-a) field includes information that may be used in validating ownership of the coin, for example as part of a process for transferring ownership of the coin. For example, in some embodiments information of the validation information field (VI-a) may be compared with information of a validation file (for example as later discussed), or used in generating further information that may be used in such a comparison. In some embodiments the information compared may be information that is the result of operations on the information of the validation information field (VI-a), for example encryption, decryption, or other operations. In some embodiments the validation information (VI-b) field includes information that may be used to verify integrity of the coin file. For example, in some embodiments the validation information (VI-b) field includes a checksum for the coin file. In some embodiments information of either or both of the validation information fields may be encrypted. In some embodiments information of the validation information (VI-b) field may also be used in validating ownership of the coin, for example as part of a process for transferring ownership of the coin. For example, in some embodiments information of both the validation information (VI-a) field and information of the validation information (VI-b) are both provided for use in validating ownership of the coin, with the information of both fields encrypted in some embodiments. In some embodiments the information is hashed, and in some embodiments the encrypted information is hashed. In some embodiments the encrypted information, once decrypted, matches information in one or more validation files. In some embodiments the hashed information matches information in one or more validation files. In some embodiments the hashed and encrypted information, once decrypted, matches information in one or more validation files.

FIG. 3B is a table of example contents of a validation file. The validation file may be used as the validation file discussed with respect to FIG. 1, FIG. 2, and FIG. 3A. In some embodiments information of the validation file is stored in a plurality of files. For example, in some embodiments information of a validation file may be specific to a particular coin, with different validation files having information for different coins. In some embodiments the validation file is stored on a compute device, for example in memory associated with a teller portion resident on the compute device. In some embodiments the memory is a direct access storage subsystem associated with a teller portion resident on the compute device. In some embodiments the compute device is a user compute device. In some embodiments the compute device is a server, or a virtual machine executing on a server. In some embodiments the validation file is stored in a teller portion of a wallet-teller component, for example the wallet-Teller 211 component of FIG. 1, FIG. 2, and/or FIG. 3A.

The validation file includes coin identification fields 351$a$-$n$. The coin identification fields identify particular coins for which information is held in the validation file. The coin identification fields 351$a$-$n$ may therefore be considered to indicate that the validation file includes information for coins a-n. Information of the coin ID field of the validation file may be the same as the coin identification field of the coin file for each particular coin. Each coin identification field is followed by subsequent fields which contain other information associated with the coin identified by the immediately prior coin identification field. For the validation file of FIG. 3A, the other information includes current and past ownership information, and additional information used in validating ownership of the coin. Different structures may be used to associate the other information with each coin, in various embodiments.

The Current owner fields 353$a$-$n$ indicate current owners for each of the coins. In some embodiments the current owners fields may instead be current owner fields a-n, 1-m, to include information indicating current owners 1-m of each of the coins a-n, with each coin potentially having m owners. In such embodiments the current owners fields may be as discussed with respect to the example coin file of FIG. 3A. In some embodiments the validation file additionally includes a further field associated with the current owner field for each coin, indicating a number of current owners of that coin. Similarly, prior owner fields 355$a$-$n$ indicate prior owners for each of the coins, and may include information as to each prior owner. In some embodiments the prior owner fields may instead be prior owner fields 1-m, 1-r, to include information indicating prior owners of each of the coins a-n. As in some embodiments 1-m entities may co-own a coin at a given time, m being a positive integer, the prior owner fields may include 1-m entries for each set of concurrent prior owners of the coin. In addition, as there may be r sets of owners or co-owners of prior owners of the coin, r being a non-negative integer, the prior owner fields may include 1-r sets of entries to encompass all of the sets of concurrent prior owners of the coin. In some embodiments the validation file may further include time stamps indicating time of ownership of the coin. In some embodiments the prior owner fields may provide a chain-of-custody for ownership of the coin. As with the current owner fields, in some embodiments the validation file may include additional fields indicating the number m of each set of concurrent prior owners and the number r indicating the number of sets of concurrent prior owners of the coin.

In some embodiments, for each coin for which there is information in the validation file, there will be each of the above-mentioned fields. In some embodiments multiple fields may be used for each of the data fields. For example, as mentioned above the current owner data fields may include, for each coin, multiple current owner data fields, allowing for listing of multiple current owners of the coin. Similarly, the prior owner(s) data field may include, for each coin, multiple prior owner data fields, allowing for the file to indicate both multiple prior co-owners of a coin and/or multiple owners at different times of the coins and to provide a validated chain-of-custody for the coin ownership and coin data record. As mentioned above, in some embodiments the validation files may include data fields, for each of the prior owner 1 through prior owner N, and a time period of the ownership of the coin.

In some embodiments the validation data fields may include coin validation information fields 357a-n. The validation information fields include information to be used in validating ownership of each of the coins. In some embodiments the validation information for each coin includes information that corresponds to the validation information of the coin data files 301. In some embodiments the coin validation information coin, includes information that, after encryption or decryption related operations (on either or both, or using either or both, of the validation information of the validation files and/or validation information of the coin data files), corresponds to validation information of the coin data files. In some embodiments the validation information, for a specific coin, comprises encrypted information.

FIG. 3C is a table providing a further example of a validation file. The validation file of FIG. 3C includes value fields 371a-m. Each field holds a value for use in validating ownership of a coin, with the validation file storing information to validate ownership of m coins. In some embodiments the value in each field corresponds to a hash of a validation field in a coin file. In some embodiments the value in each field corresponds to a hash of multiple validation fields in a coin file. In some embodiments the value in each field is encrypted, and when decrypted corresponds to a hash of one or more fields in a coin file. In some embodiments the value in each field, when encrypted, corresponds to a hash of one or more fields in a coin file. In some embodiments the validation file may instead include 2*m fields, with two fields for use in validating ownership of a coin, instead of a single field.

Figure 4:
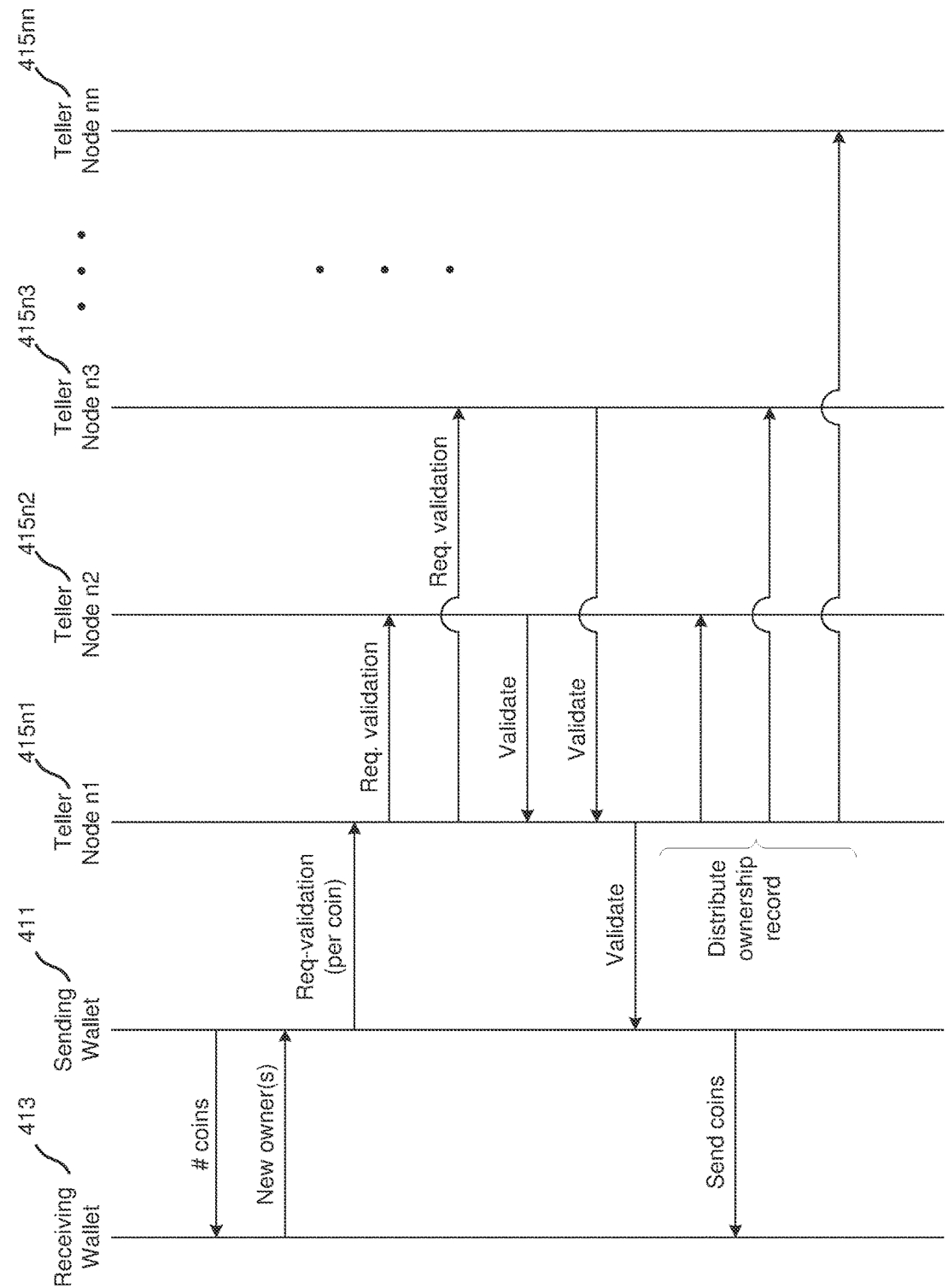
FIG. 4 is a sequence diagram showing operations in an example transfer of ownership of digital currency, in accordance with aspects of the invention.

FIG. 4 is a sequence diagram showing operations in an example transfer of ownership of digital currency. In the sequence, a sending wallet 411 provides information to a receiving wallet 413 of a number of coins to be transferred from an owner of the sending wallet 411 to the owner of the receiving wallet 413. Both the sending wallet 411 used by the current coin owner and the receiving wallet 413 used by the to-be new owner may be a portion of a wallet-teller component, for example the wallet-teller component 211 of FIG. 2. In some embodiments the wallets may be on a compute device, for example as discussed with respect to FIG. 1, FIG. 2. FIG. 3A, and FIG. 3B. In some embodiments the wallets, or one of them, may be accessed by way of a compute device, with the wallets resident on some other device. The user compute device of the owner of the sending wallet 411 may be considered a sending user compute device, and the owner of the sending wallet 411 may be considered to be a sender. The sending wallet 411 may store information regarding the coins to be transferred in coin data files, for example the coin data files 301 discussed with respect to FIG. 3A. The coin data files may be stored in memory accessible to the sender user compute device, for example a direct access storage subsystem. In some embodiments the coin data files may be stored in network connected memory, for example a direct access storage subsystem.as the network connected memory may be, for example, a network mapped drive, cloud storage, or other memory or storage accessible over a network connection.

The receiving wallet 413 provides the sending wallet 411 information regarding the to-be new pending owner or new owners of the coins. As discussed earlier, in some embodiments a coin may have a single owner or multiple co-owners. For simplicity of discussion, reference may be had either to an owner or to multiple owners, with it being understood that the plural refers to the singular as well, and vice versa, unless the context indicates otherwise. In some embodiments the information regarding the to-be new pending owners of the coins comprises unique identifiers for the to-be new pending owners. In some embodiments the unique identifiers for the to-be new pending owners matches the unique identifiers to be stored in coin data files for the to-be new pending owners. In some embodiments the to-be new owners utilizing the receiving wallet 413 may be a single to-be new owner, in some embodiments the to-be new owners are a plurality of new owners. The user compute device of the owner of the Receiving Wallet 413 may be considered a receiving user compute device, and the owner of the Receiving Wallet 413 may be considered to be a receiver.

The sending wallet 411 sends a request to a teller node 415n1 to transfer ownership of the coin units from the sender to the to-be new owners. In some embodiments the request is on a per coin basis. The request may include some or all of the information in the coin data files for the coins to be transferred. In some embodiments the request includes, for each coin, a unique identifier of the Sending wallet 411, a unique identifier of the receiving wallet 413, a unique identifier for the coin, for example a coin identification record, unique identifiers of the owners of the coins, and validation information for the coin. In some embodiments the request also includes unique identifiers of the to-be owners of the coins.

The teller node 415n1 which receives the request to transfer ownership may be a teller portion of a wallet-teller component on a compute device other than the sender or receiving user compute device. In some embodiments the wallet function portions, for example the sending wallet 411, includes information for use in sending requests to teller nodes. For example, in some embodiments the wallet function portions may include a sequential list of teller nodes and contact information for those teller nodes, which the wallet functions portion may sequentially contact until a teller node indicates availability. In some embodiments the contact information includes IP addresses or other network node identifiers which may be used for network routing functions. In some embodiments the teller portion of the sender's wallet-teller 211 component may maintain such a list, with the sender's wallet portion requesting such information from the sender's teller portion.

The teller node n1 415n1, in some embodiments searches validation files stored in memory accessible to the teller node n1. In such embodiments the teller node n1 searches the validation files to determine if the teller node n1 includes information to validate ownership of the coins. The memory may be a direct access storage subsystem, in some embodiments. The validation files may be as discussed with respect to FIG. 3B or 3C. within a direct access storage subsystem of or accessible to the compute device on which the teller node n1 executes. In some embodiments, and as shown in FIG. 4, the teller node n1 requests validation of current ownership of the coins from a plurality of other teller nodes, for example teller node n2 415n2, teller node n3 415n3, and so on until Teller Node nn 415nn. In some embodiments the teller node n1 requests validation of current ownership of the coins from other teller nodes only if the teller node n1 does not include information in its validation files to validate ownership of the coins. In some embodiments the teller node n1 does not search validation files to determine if the teller node n1 includes information in its validation files to validate ownership of the coins, with instead the teller node n1 automatically requesting validation of ownership of the coins from other teller nodes. In some embodiments, the validation is completed on a per coin basis, in other embodiments, the validation is completed for multiple coins at a time, for example using multiple coin files or by utilizing information from multiple coin files aggregated into a single file or database structure.

The group of teller nodes n1 415n1 through teller node nn 415nn may be referred to collectively as teller nodes, and may be considered to form a teller node network. If all of the known members of the teller nodes have been sent requests for coin validation and none have responded with a confirmation in the affirmative, the coin validation request is considered to have failed. In some embodiments the teller node n1 assumes that no confirmation is or will be received if a confirmation is not received within a predetermined time period. Thereafter the Teller Node n1 415n1 sends a denial message to the sending wallet 411, and further processing of the coin unit ownership transfer is stopped and not completed.

In some embodiments the coin validation request includes coin identification information, identification of the sender or the sending wallet 411, current owner information, and validation information for the coin, for example as shown in the coin validation information fields. In some embodiments the coin validation request includes a hash of one or both of the validation information fields of a coin data file for the coin. In some embodiments the validation information may be the validation information as received from the sending wallet 411. In some embodiments the other teller nodes of the Teller Node Network comprise teller function portions of wallet-teller components of other compute devices. In the sequence diagram of FIG. 4, the teller node n1 searches any validation files in memory accessible to the compute device of the teller node 415n1 to validate coin ownership. If the coin ownership validation cannot be confirmed by teller node n1, teller node n1 sends a validation request for the current ownership of the coins to teller node n2 415n2, and in some embodiments further teller nodes, for example teller node n3 415n3. If the ownership claim request is not validated by these teller nodes, the teller node n1, and/or the other teller nodes from whom coin ownership validation was requested, may request validation of coin ownership from still further teller nodes. In some embodiments such a process may continue until all known available teller nodes have been requested to validate coin ownership. In various embodiments the teller node n1 may request validation of current ownership from only a single validating teller node, or from a greater number of validating teller nodes, for example 10 or more validating teller nodes. In some embodiments each teller function portion of a wallet-teller component maintains information for use in sending validation requests to other teller nodes. For example, in some embodiments the teller portions may include a sequential list of teller nodes network addresses and contact information for those teller nodes, which the teller node n1 may use to contact other teller nodes for validation actions. In some embodiments the contact information includes Internet based TCP/IP addresses (IPv4, IPv6, etc.) or other network node identifiers which may be used for network routing functions.

The validating teller nodes each determine whether or not the current ownership of the coin as indicated by information provided with the request for ownership validation matches the ownership record of the coin as reflected in validation files maintained by each validating teller node, In some embodiments the validating teller nodes may also determine whether the sender is qualified to request transfer of the coin. In some embodiments the sender is qualified to request transfer of the coin if the sender is at least one of the validated current owners of the coin. In some embodiments each validating teller node determines if a validation files of that validating teller node includes validation information for the coin. If not, that validating teller node may send the sequential list of teller nodes network addresses to the Teller Node n1, thereafter the validating teller node ceases processing relating to ownership of the coin. In some embodiments the validating teller node may also send a message to the Teller Node n1 that the validating teller node has no records of ownership for the coin. If validation files of the validating teller node does include information for the coin, the validating teller node determines if the ownership information of the request matches the ownership validation information for the coin, and, in some embodiments, that the sender is one of the owners of the coin. If the ownership information of the request does not match the ownership validation information for the coin, or, in some embodiments, the sender is not one of the owners of the coin, the validating teller node ceases processing relating to ownership of the coin. In some embodiments, the validating teller node may also send a message to the teller node n1 that the ownership information for the coin indicated by the request does not match ownership information for the coin as maintained by the validating teller node. If the ownership information of the request does match the ownership information for the coin, and in some embodiments the sender is one of the owners of the coin, the validating teller node send a message to the Teller Node n1 that ownership of the coin is validated.

In some embodiments, the validation teller nodes initially requested to validate ownership of the coins may be considered a first round of validation teller nodes. In some embodiments, the teller node n1 may request validation of current ownership of the coins from further validation teller nodes, in the event that the first round of validation teller nodes are unable to validate ownership of the coins. In some embodiments the teller node n1 may request validation of current ownership of the coins from a second round of validation teller nodes, the second round of validation nodes being of different teller nodes than the first round of validation teller nodes, if the first round of validation teller nodes is unable to validate ownership of the coins. In some embodiments requests to validate ownership of the coins may proceed iteratively, with still further rounds of validation teller nodes requested to validate ownership, until either ownership of the coins is validated, a predetermined limit on rounds of validation teller nodes is reached, or the teller node network is exhausted. In some embodiments the teller node n1 determines validation teller nodes of the second and further rounds of validation nodes. In some embodiments validation teller nodes of a prior round of validation teller nodes determine validation teller nodes of a subsequent round of validation teller nodes. In some embodiments the validation teller nodes of the prior round of validation teller nodes determine validation teller nodes of a subsequent round of validation teller nodes in response to a request to do so from the Teller Node n1. In some embodiments the validation teller nodes of the prior round of validation teller nodes determine validation teller nodes of a subsequent round of validation teller nodes in response to a request to do so from the Teller Node n1 or from a validation teller node of a round of validation teller nodes prior to the prior round of validation teller nodes.

In some embodiments the teller node n1 determines that the ownership of the coin by the sender is valid if any of the validating teller nodes validates the ownership of the coins. In some embodiments the teller node n1 determines that the ownership of the coin by the sender is valid if some predetermined number of the validating teller nodes validate ownership of the coins. In some embodiments the teller node n1 provides a message to the sending wallet that the sender's ownership of the coins has been validated. In some embodiments the teller node n1 also distributes updated ownership records for the coins to a plurality of other teller nodes, with the updated ownership records indicating the to-be owners of the coins as the now current owners of the coins. In some embodiments the updated ownership records are sent on a coin-by-coin basis. In some embodiments the other teller nodes receiving the updated ownership records include the validating teller nodes. In some embodiments the other teller nodes include some or all of the validating teller nodes and other teller nodes. In some embodiments less than all of the teller nodes are provided updated ownership records for a coin. Providing less than all of the teller nodes updated ownership records for a coin may be beneficial in reducing possible power requirements across all teller nodes and increasing the teller node network ability to process transactions even if some teller nodes are unavailable, albeit at a potential cost of requesting confirmation of ownership from an increased number of teller nodes. In some embodiments the plurality of other teller nodes each update validation files maintained by those nodes with information of the updated ownership records.

The sending wallet sends the coin data for the coins to the receiving wallet. In some embodiments the sender wallet does so in response to receiving confirmation of ownership of the coins by the sender from the teller node n1. In some embodiments the sender wallet also deletes the coin data from the sender wallet and memory of the sender compute device, which may be a direct access storage subsystem of or accessible to the sender wallet.

Figure 5:
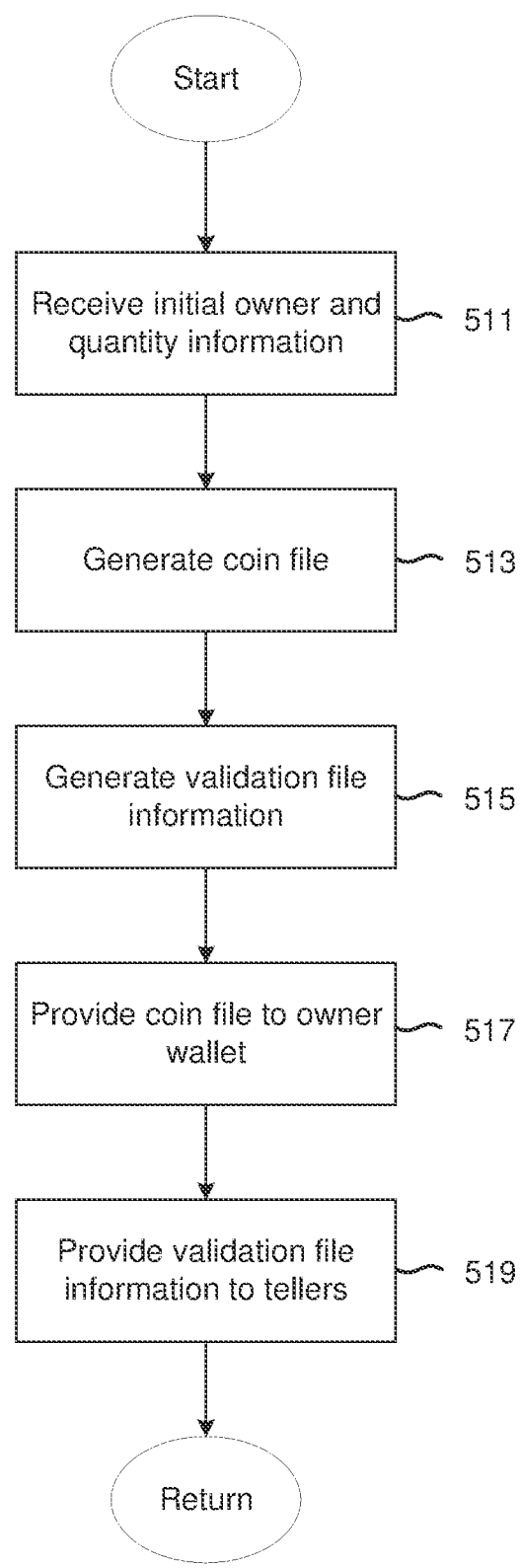
FIG. 5 is a flow diagram of an example process for initial provision of coins of a digital currency, in accordance with aspects of the invention.

FIG. 5 is a flow diagram of a process for initial provision of coins of a digital currency. In some embodiments the process is performed by a system, for example the system of FIG. 1. In some embodiments the process is performed by a server 117, for example the server of FIG. 1. In some embodiments the process is performed by a user compute device configured as a digital currency creating computing device. In some embodiments the process is performed by a digital currency creating computing device or a coin minting computing device. In some embodiments the process is performed by one or more processors configured by program instructions.

In block 511 the process receives information for an initial owner of coins of a digital currency, and information of an initial quantity of those coins. In some embodiments the coins may be of different denominations, and the process may additionally receive information regarding the denominations of the coins. In some embodiments a server or digital currency minting computing device receives the initial information. In some embodiments the server or digital currency minting computing device receives the information from another compute device. In some embodiments the server or digital currency minting computing device receives information for a plurality of initial owners and a quantity of coins to distribute to those initial owners, and the computer is programmed to allocate the coins to the initial owners.

In block 513 the process generates a coin data files. In some embodiments coin data files are generated for each new coin to be distributed. In some embodiments the coin data files includes a unique identifier for the coin, a unique identifier for each owners of the coin, and validation information for the coin. In some embodiments the coin data files are as discussed with respect to FIG. 3A.

In block 515 the process generates validation files information for the coin. In some embodiments the validation files information includes the unique identifier for the coin, information as to initial owners of the coin, and validation information for the coin. In some embodiments the validation files information simply includes validation information for the coin. In some embodiments the validation files information for the coin is as discussed with respect to FIG. 3B. In some embodiments the validation files information for the coin is as discussed with respect to FIG. 3C.

In block 517 the process provides the coin data to a wallet of an initial owner of the coin. In some embodiments the wallet is a wallet portion of a wallet-teller component, for example as discussed with respect to FIG. 2. In some embodiments the wallet-teller component is resident on a user compute device of an initial owner of the coin. In some embodiments the wallet-teller component is resident in memory accessible to a user compute device of an initial owner of the coin. In some embodiments the coin data of an initial owner or a plurality of initial owners of the coin is the coin data files as discussed with respect to FIG. 3A.

The process thereafter returns.

In block 519 the process provides the validation files information to a plurality of teller nodes. In some embodiments the validation files are as discussed with respect to FIG. 3B. In some embodiments the validation files are as discussed with respect to FIG. 3C. In some embodiment the teller nodes are as discussed with respect to FIG. 4. In some embodiments the teller nodes are teller portions of Wallet-Teller 211 components resident on compute devices, which may be comprised of, or consist of in some embodiments, user compute devices. In some embodiments the teller portions store the coin ownership validation information in validation files stored in memory associated with the teller function portions of the wallet-teller components. In some embodiments the memory is a direct access storage subsystem.

Figure 6:
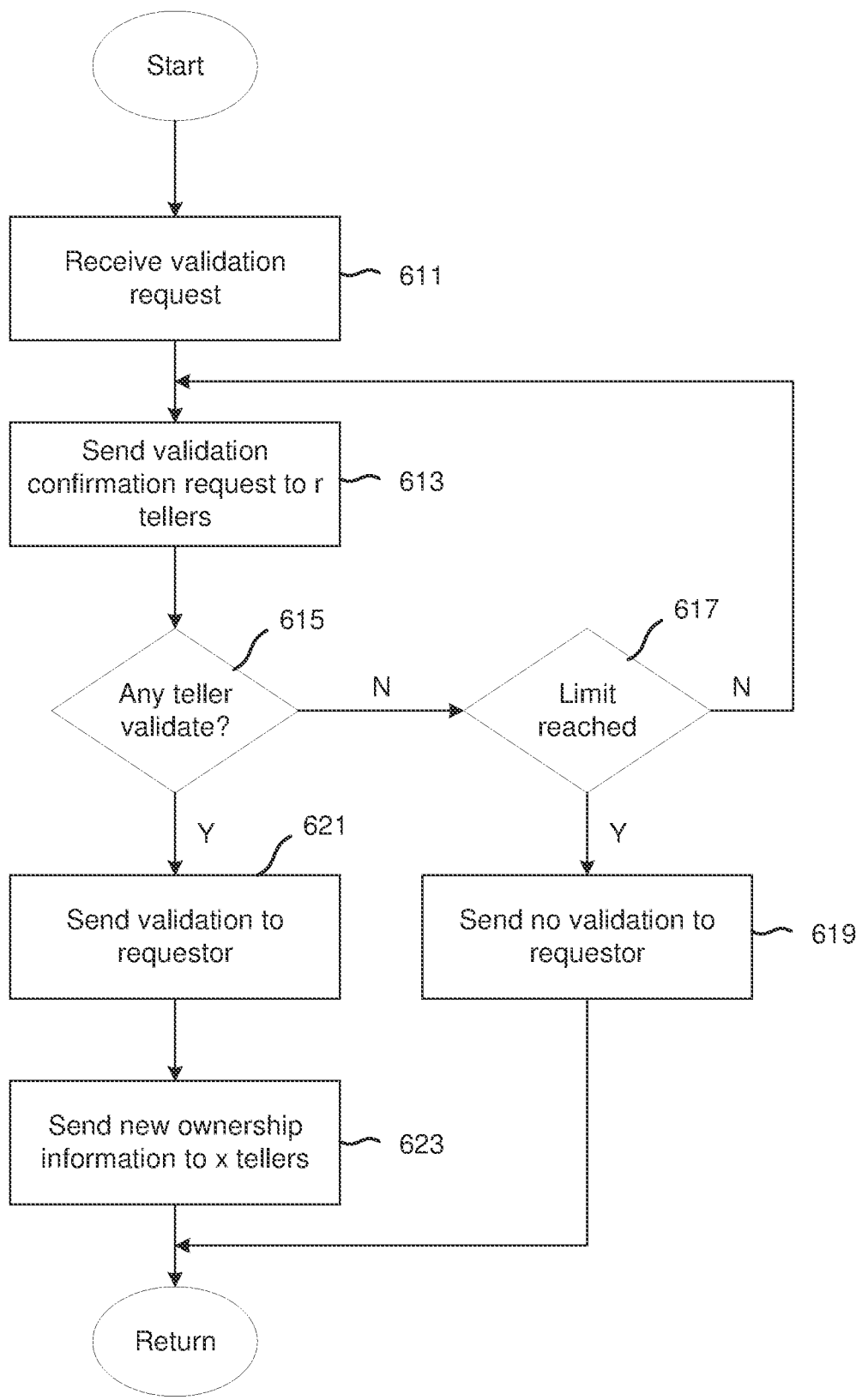
FIG. 6 is a flow diagram of an example process that may be used in transferring ownership of coins of a digital currency, in accordance with aspects of the invention.

FIG. 6 is a flow diagram of an example process that may be used in transferring ownership of coins of a digital currency. In some embodiments the process is performed by a system, for example the system of FIG. 1. In some embodiments the process is performed by a user compute device, for example a user compute device of FIG. 1. In some embodiments the process is performed by a wallet-teller component utilizing wallet and teller functions running on a compute device of FIG. 2. In some embodiments the process is performed by a teller node, for example the teller node n1 as shown in FIG. 4. In some embodiments the process is performed by one or more processors configured by program instructions.

In block 611 the process receives a request to validate ownership of a coin of a digital currency. In some embodiments the request includes a unique identifier of the coin, unique identifiers of owners of the coin, and information to be used in validating ownership of the coin. In some embodiments information to be used in validating ownership of the coin is validation information for the coin, or information based on validation information for the coin. In some embodiments the request includes a unique identifier of a wallet requesting validation of ownership of the coin. In some embodiments the request to validate ownership of the coin is part of a process of transferring ownership of the coin to the to-be owners of the coin. In some embodiments the request additionally includes unique identifiers of the to-be owners of the coin. In some embodiments the request is received by a teller node, for example the teller Node n1 of FIG. 4. In some embodiments the teller node is a teller portion of a wallet-teller component resident on a compute device, which in some embodiments is a user compute device.

In block 613 the process sends requests to confirm validation of ownership of the coin. In some embodiments the process sends requests to confirm validation of ownership of the coin to a plurality of validation teller nodes. In some embodiments the initial teller node sends the requests. In some embodiments the initial teller node is the teller node n1 of FIG. 4. In some embodiments the validation teller nodes are the other teller nodes of FIG. 4. In some embodiments the request to confirm validation of ownership of the coin includes a unique identifier of the coin, unique identifiers of owners of the coin, and information to be used in validating ownership of the coin. In some embodiments the request to confirm validation of ownership of the coin includes information of the validation fields of a coin file for the coin, or information based on information of the validation fields of the coin file for the coin. In some embodiments the coin file is as discussed with respect to FIG. 3A. In some embodiments the request to confirm validation of ownership of the coin additionally includes a unique identifier for an owner of the wallet portion of a wallet-teller component resident on a compute device of an owner of the coin. In some embodiments the wallet-teller component is as discussed with respect to FIG. 2. In some embodiments the plurality of validation teller nodes are determined using a list of validating teller nodes. In some embodiments the list is maintained by the initial teller node. In some embodiments the list of potential validating teller nodes includes a greater number of validating teller nodes than the number of the validating teller nodes to which the requests to confirm validation of ownership of the coin. In some embodiments the list of teller nodes is encrypted. In some embodiment the validating teller nodes that are sent validation of ownership requests have configurations as discussed with respect to FIG. 2 and/or FIG. 4. In some embodiments the process sends a request to confirm validation of ownership of the coin to r teller nodes. In some embodiments r is any positive integer. In some embodiments r is any positive integer greater than 1. In some embodiments r is a positive integer between 10 and 100, inclusive. In some embodiments r is about 15. In some embodiments, if the operations of block 613 are performed as a result of any combination of operations of block 615 (later discussed) and/or the operations of block 617 (later discussed), the process sends the request to confirm validation of ownership of the coin to r teller nodes that are different than teller nodes previously requested, as part of processing of the transaction and to confirm validation of ownership of the coin.

In block 615 the process determines if the validation confirmation request for the ownership claim of the coin confirms valid ownership or returns no response. If a validate ownership claim of the coin is confirmed in the affirmative, the process proceeds to block 621 to continue with the transaction and ownership transfer of the coin. If no response is received the process continues to block 617 (later discussed).

In block 617, the process determines if a predetermined limit has been reached on requesting teller nodes to confirm validation of ownership of the coin. In some embodiments the predetermined limit is considered to have been met if requests have been sent to all available teller nodes, for example so as to exhaust the teller nodes. In some embodiments the limit may be expressed by a predetermined total number of requests to teller nodes to confirm validation of ownership of the coin. In some embodiments the limit may be expressed by a predetermined number of rounds that the process requested teller nodes process to confirm validation of ownership of the coin. If a limit has not been reached, the process goes to block 613. If the limit has been reached, the process goes to block 619.

In block 619, the process optionally sends an ownership validation failure. In some embodiments the ownership validation failure is sent to the wallet which originally requested the transfer of ownership of the coin. In some embodiments the process does not send an ownership validation confirmation and no validation of the ownership claim of the coin occurs.

In block 621, the process sends a message that ownership of the coin has been validated. In some embodiments the message is sent to the requestor, a message is sent to authorize the coin transaction and the coin ownership transfer. In some embodiments, the process will send a confirmation of the ownership claim for the coin to a sending wallet, for example the sending wallet of FIG. 4.

In block 623, the process sends new information for the coin. In some embodiments the new information for the coin is sent to a plurality of teller nodes. In some embodiments plurality of teller nodes is an integer greater than r. In some embodiments plurality of teller nodes is equal to r. In some embodiments plurality of teller nodes is a positive integer less than r. In some embodiments the new information for the coin includes the unique identifier for the coin, the unique identifiers for the new owners of the coin, and validation information for the coin. In some embodiments the new information for the coin simply validation information for the coin, for example as discussed with respect to FIG. 3C.

The process thereafter returns.

Figure 7:
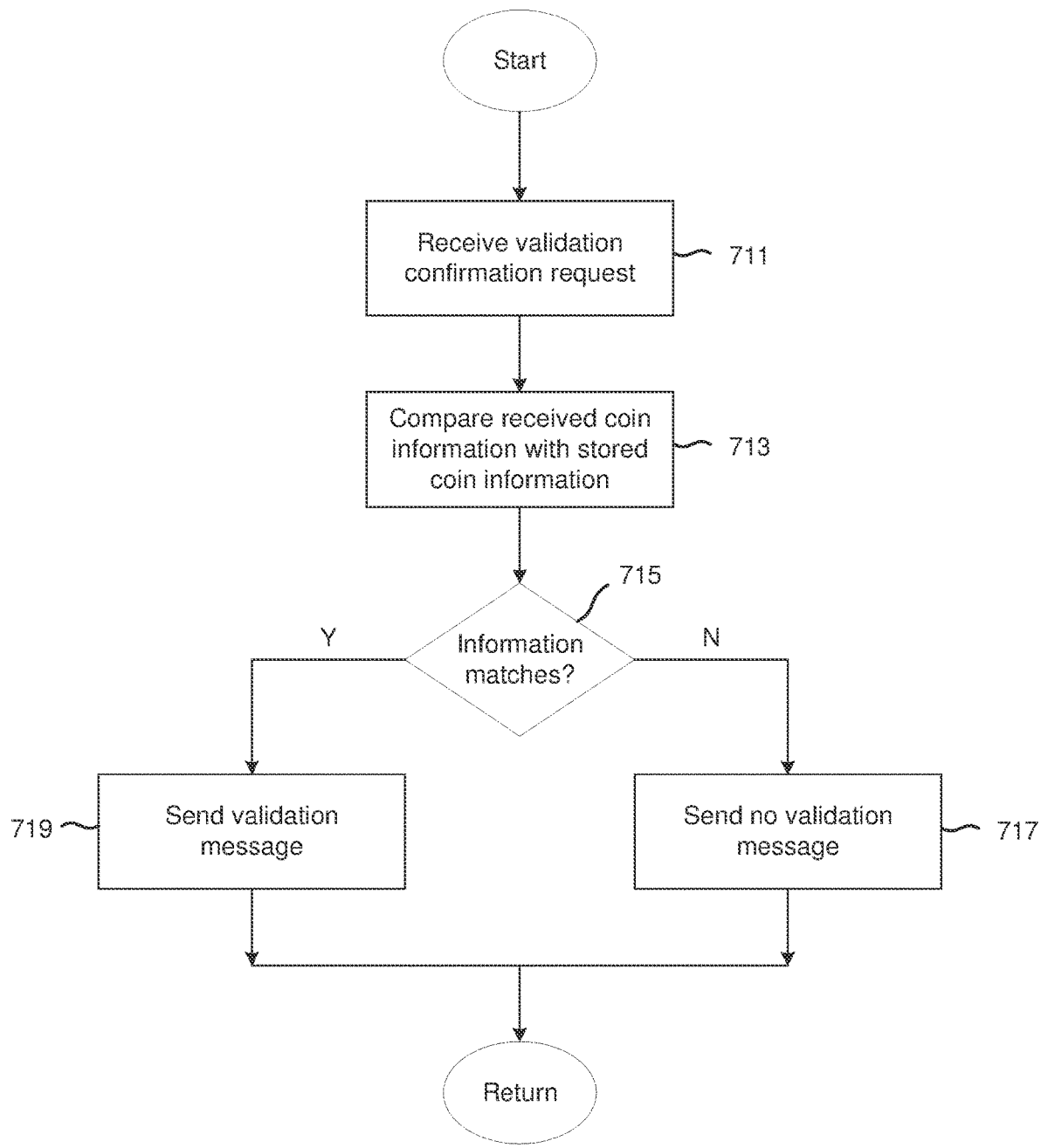
FIG. 7 is a flow diagram of an example process that may be used in validating ownership of coins of a digital currency, in accordance with aspects of the invention.

FIG. 7 is a flow diagram of an example process that may be used in validating ownership of coins of a digital currency. In some embodiments the process is performed by a system, for example the system of FIG. 1. In some embodiments the process is performed by a compute device, for example a user compute device of FIG. 1. In some embodiments the process is performed by validating teller node, for example a validating teller node as discussed with respect to FIG. 4. In some embodiments the process is performed by one or more processors configured by program instructions.

In block 711, the process receives a validation confirmation request to confirm an ownership claim of a coin of digital currency. In some embodiments the request includes a unique identifier of the coin, unique identifiers of owners of the coin, and information to be used in validating ownership of the coin. In some embodiments the request includes information of validation information of a coin file, or information based on information of validation information of a coin file. In some embodiments the request is received from an initial teller node, for example the teller node n1 of FIG. 4.

In block 713, the process compares the received coin information for the coin ownership transfer request with stored coin information. In some embodiments the compared information includes a unique identifier of the coin, unique identifiers of owners of the coin, and information to be used in validating ownership of the coin. In some embodiments the compared information includes validation information for the coin, or information based on validation information of the coin. In some embodiments the stored coin information is stored in memory of or associated with a teller portion of a wallet-teller component. In some embodiments the memory is a direct access storage subsystem. In some embodiments the stored coin information is part of a validation files, for example as discussed with respect to FIG. 3B or FIG. 3C. In some embodiments the process performs encryption and/or decryption operations on the received coin information and/or the stored coin information.

In block 715, the process determines if the received coin information matches the stored coin information. If the coin information matches, the process proceeds to block 719. If the coin information does not match, the process proceeds to block 717.

In block 717, process sends a no validation message. In some embodiments the process sends the no validation message to the initial teller node. In some embodiments, however, in block 717 no message is sent.

In block 719 the process sends a validation message. In some embodiments the validation message is sent to the initial teller node.

The process thereafter returns.

Figure 8:
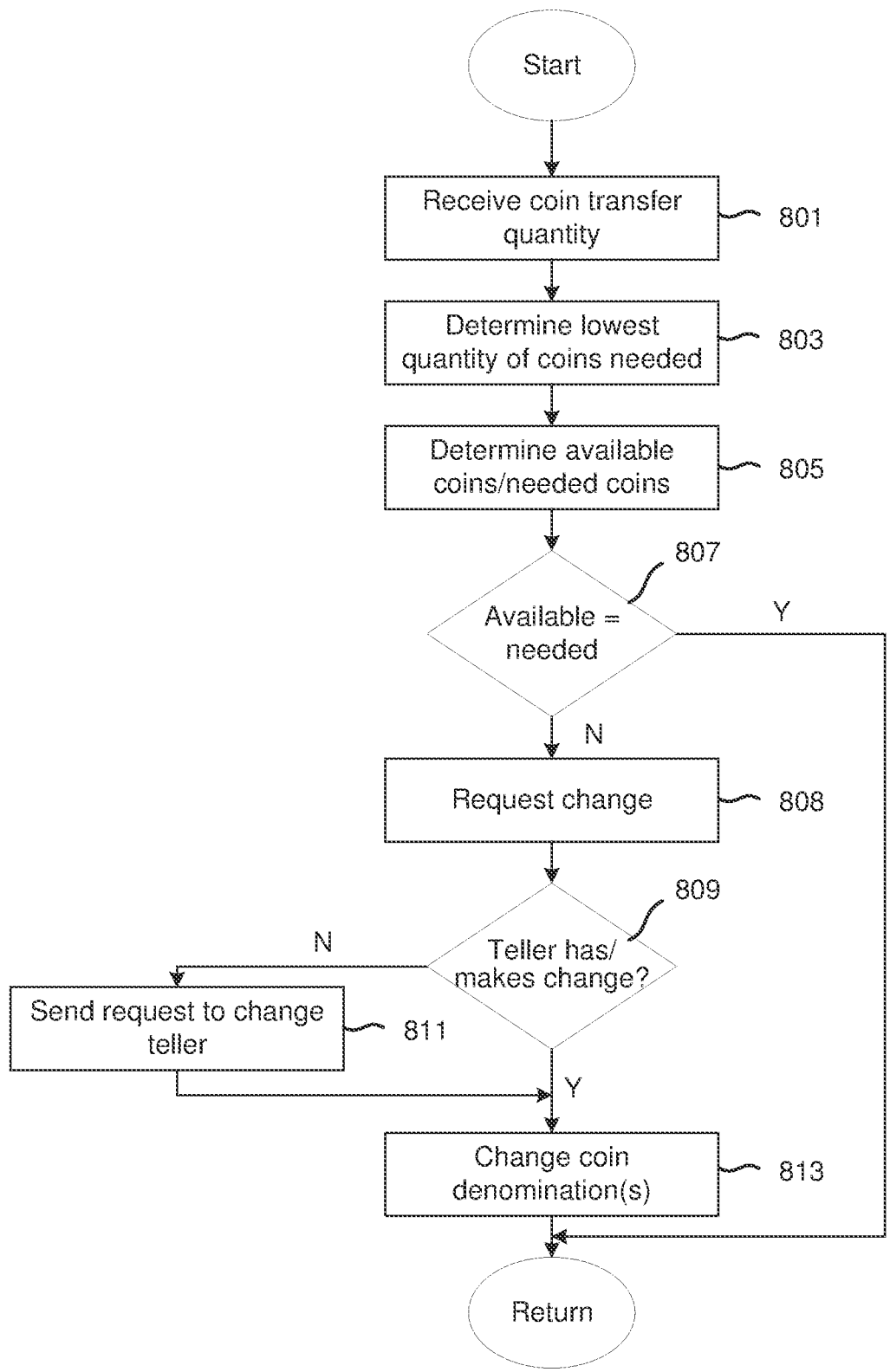
FIG. 8 is a flow diagram of an example process that may be used in the automatic processing of change of digital currency coins having denomination value types helping to facilitate transactions, in accordance with aspects of the invention.

FIG. 8 is a flow diagram of an example process that may be used to provide automatic processing of change of a denomination based coin unit of a digital currency. Some embodiments provide the exchange and ownership transfer of larger denomination unit for a number of smaller denomination units or of a number of smaller denomination units for a larger denomination unit and automatically validating the new coin unit ownership. This process of checking the coin denomination unit quantity to complete a transaction may be initiated during an existing digital currency transaction prior to the sender and receiver transfer process whereby the sender confers coin ownership to the receiver, for example as discussed with respect to FIG. 4. In some embodiments the process is performed by a system, for example the system of FIG. 1. In some embodiments the process, or portions of the process, is performed by a compute device, for example a user compute device, which may be a user compute device of FIG. 1. In some embodiments the process, or portions of the process, is performed by a wallet portion of a wallet-teller component, for example the wallet-teller component of FIG. 2. In some embodiments the process, or portions of the process, is performed by a teller portion of a wallet-teller component. In some embodiments the process is performed by multiple user compute devices. In some embodiments the process is performed by a wallet portion of a wallet-teller component of a first user compute device and a teller portion of a wallet-teller component of a second user compute device.

In block 801, the process obtains a total desired number of coin units to transfer or send from the sender to the receiver. In some embodiments, the user is asked the quantity of coins to transfer and enters the quantity into the sending wallet or receiving wallet. In some embodiments, the number of coin units to transfer can be determined during automated processing, which may be referred to as merchant mode, automatic receive mode, or automatic send mode as selected.

In block 803, the process calculates the lowest quantity of coin units by denomination value needed for the number of total coins to be transferred. The mathematical reduction of the quantity to the lowest number of coin units by denomination type may be automatically determined and processed. For example, if the sender has a single (1) quantity of a ten (10) unit coin denomination and selects seven (7) coin units to transfer, the lowest possible denominational amount would be to exchange the ten (10) unit coin denomination to a quantity of one (1) unit of a five (5) denomination coin unit and a quantity of five (5) units of a one (1) coin unit denomination.

In block 805, the process determines coins available in the wallet for the transfer and the coins needed for the transfer. In some embodiments the process counts and completes an inventory of the owner coin quantity of the various coin denominations. In some embodiments the individual coin unit denominations types are held and possessed within the direct access storage subsystem of the compute device of other applicable data storage type or locations as configured. In some embodiments the process calculates a coin difference by denomination type between the coins needed for the transfer and the coins available for the transfer. this provides the number of coin units by denomination type to complete a coin ownership transaction.

In block 807 the process determines if any quantity of additional coin denomination units are required for any coin unit quantity per denomination type. If so, the process continues, then the process continues to block 808. If any quantity of additional coin denomination units are not required or are not locally available for any coin unit denomination per type the process returns.

In block 808 the process requests that coin denominations be changed. In some embodiments the sending wallet sends to a teller node a request to exchange a number of coins in a first set of denomination(s) for a number of coins in a second set of denomination(s) denominations, with the value of the coins in the first set of denomination(s) being equal in value to the value of the coins in the second set of denomination(s). In other words, the sending wallet sends to the teller node a request to make change. In some embodiments the teller node, in response, directs a message to the sending wallet confirming the acceptance of the task to exchange coin denomination units, in other words confirming that the teller node (or, in some embodiments, some teller node) will make change for the sending wallet.

In block 815, the process determines if the teller node is a teller node that makes change, and, if so, whether the teller node has coins available in appropriate denominations to make change. If so, the teller node may be considered a change teller. In some embodiments only a subset or particular teller nodes may be configured to make change. If the teller node is not a teller node configured to make change, the process goes to block 811. If the teller node is configured to make change, the process counts and completes an inventory of the teller node coin quantities of the various coin denominations. In some embodiments the individual coin unit denominations types are held within the compute device. In some embodiments the individual coin unit denominations types are held and possessed within the direct access storage subsystem and are comprised of a plurality of coin units, also referred to as a record of multiple units of coins, within the coin data files, for example as discussed with respect to FIG. 3A. The total desired number of coin units by denomination type are computed for the process of making of change and the requested ownership transfer from the teller node to the sending wallet. In some embodiments operations as discussed with respect to blocks 803 and/or 805 are performed to compute the required quantity of coin units by denomination type. If a quantity of coin units for a specific coin denomination type is available from the teller node, and the teller node is configured to make change, the process proceeds to block 813. If a quantity of coin units for a specific coin denomination type is not available from the teller node the process proceeds to block 811. In some embodiments teller nodes, or some number of teller nodes, hold for each denomination type a quantity of coin units in reserve for the making of change. In some embodiments the process of making of change is centralized to a single teller node or a small subset of teller nodes performing the process on a designated basis. In some embodiments the process of making of change is decentralized and spread among the many number of teller nodes performing the process on a designated basis. In some embodiments for each denomination type a quantity of coin units in reserve is held for the making of change and is stored in a direct access storage subsystem associated with a teller portion of a wallet-teller 211 component, for example a wallet-teller component as discussed with respect to FIG. 2.

In block 811, the process requests that another teller node make change. In some embodiments the teller node contacts another teller node, which may be referred to as a change teller node, to make the change. In some embodiments the sending wallet, in some embodiments as requested by the teller node, contacts the other teller node to make the change. In some embodiments multiple teller nodes may be sequentially or iteratively contacted until a change teller able to make the change is located, or the teller node network is exhausted.

In block 813 the process changes coin denomination values, or, in other words, makes change. In some embodiments the sending wallet sends coin data including coin information to validate the current owner to the change teller node. In some embodiments the record for each coin includes a unique identifier for the coin, indicates a denomination for the coin, and indicates the owner of the coin. In some embodiments the records for each coin include records containing additional information. In some embodiments the change teller node contacts other validating teller nodes and sends the coin data. If validation is achieved within the teller node or change teller node devices, the coin teller node confirms the coin ownership claim to the sending wallet and the teller node. In some embodiments the change teller node performs operations of the process of FIG. 4 and/or FIG. 5 to validate ownership by the sending wallet of the coins to be changed. The sending wallet sends coin units utilizing the require coin unit denomination to the teller node. The change teller nodes then replicate the coin ownership information to the validating teller nodes. The teller node then sends a message acknowledging receipt of the coin units to the sending wallet. The change teller node contacts other validating teller nodes and sends the coin data. If validation is achieved within the teller node or change teller node devices, the coin teller node confirms the coin ownership claim to the sending wallet and the teller node. The sending wallet sends the coin unit from the sender wallet to the teller node. If the processing to make change and exchange of a number of coin units for a similar number of total coin units in different denomination values is successful, the process returns.

Although the invention has been discussed with respect to various embodiments, it should be recognized that the invention comprises the novel and non-obvious claims supported by this disclosure.

What is claimed is:

1. A method of validating ownership, for completing a transaction, comprising:
  receiving, from a user computing device:
    a request to validate ownership of a coin; and
    validation information for the coin, wherein the validation information has been stored in a coin data file on the user computing device;
  providing the validation information to a plurality of other user computing devices, wherein:
    each of the plurality of other user computing devices stores supplementary information to be used in validating the ownership of the coin by an owner;
    the supplementary information stored by each of the plurality of other user computing devices comprises a unique checksum for the validation information for the coin; and
    the user computing device and the plurality of other computing devices are communicatively coupled in a mesh network configuration;
  receiving, from at least one of the plurality of other user computing devices, a message that the ownership of the coin by the owner is validated; and
  in response to receiving the message that the ownership of the coin is validated;
    sending a message to the user computing device that the ownership of the coin is validated; and
    distributing updating information, to update the ownership of the coin from the owner to a to-be owner, to at least some of the plurality of other user computing devices.

2. The method of claim 1, wherein the updating information to update the ownership of the coin is based, at least in part, on an additional coin data file reflecting that the to-be owner of the coin is now the owner of the coin.

3. The method of claim 1, wherein the validation information is based, at least in part, on identification information stored in the coin data file.

4. The method of claim 1, wherein the owner of the coin comprises a set of a plurality of joint owners.

5. The method of claim 1, wherein the to be owner of the coin comprises a set of a plurality of joint to be owners.

6. The method of claim 1, wherein at least one of the user computing device and the plurality of other user computing devices are configured to provide digital wallet functions and digital teller functions.

7. The method of claim 6, wherein:
  the digital wallet functions store identification information on a first set of coins owned by a first user of the user computing device; and
  the digital teller functions validate ownership of a second set of coins owned by a second user of the plurality of other user computing devices.

8. The method of claim 7, wherein the digital teller functions transmit commands for providing:
  the validation information to the plurality of other user computing devices; and
  the updating information to the at least some of the plurality of other user computing devices.

9. The method of claim 1, further comprising sending the coin data file from the user computing device to a particular user computing device owned by the to be owner of the coin.

10. The method of claim 1, wherein the user computing device:
   stores network contact information for the plurality of other user computing devices; and
   utilizes the network contact information for the plurality of other user computing devices in providing, to the plurality of other user computing devices:
     identification information on the coin,
     identification information on the owner of the coin, and
     the validation information.

\* \* \* \* \*